United States Patent [19]

Randall, Jr. et al.

[11] Patent Number: 4,950,720

[45] Date of Patent: Aug. 21, 1990

[54] MODIFIED POLYPROPYLENE, PROCESS FOR MAKING AND ARTICLE MADE FROM THE SAME

[75] Inventors: James C. Randall, Jr., Seabrook; Ferdinand C. Stehling, Baytown; Michael C. Chen, Deer Park; Larry W. Colwell, Friendswood, all of Tex.

[73] Assignee: Exxon Chemical Patents Inc., Linden, N.J.

[21] Appl. No.: 188,260

[22] Filed: Apr. 29, 1988

[51] Int. Cl.$^5$ .................. C08L 23/12; C08L 23/16; C08F 297/08
[52] U.S. Cl. ................... 525/322; 525/323; 525/240
[58] Field of Search ................. 525/240, 322, 323

[56] References Cited

U.S. PATENT DOCUMENTS

| | | | |
|---|---|---|---|
| 3,051,690 | 8/1962 | Vandenberg | 260/88.2 |
| 3,301,921 | 1/1987 | Short | 260/878 |
| 3,358,056 | 12/1967 | Renaudo | 260/878 |
| 3,401,212 | 9/1968 | Griffen | 260/878 |
| 3,414,637 | 12/1968 | Jone et al. | 260/878 |
| 3,529,037 | 9/1970 | Hagemeyer, Jr. et al. | 260/878 |
| 3,737,557 | 6/1973 | Verne et al. | 174/23 R |
| 3,817,783 | 6/1974 | Verne et al. | 117/226 |
| 3,954,704 | 5/1976 | Verne et al. | 260/42 |
| 3,970,719 | 7/1976 | Edmonds, Jr. | 260/878 B |
| 4,039,632 | 8/1977 | Edmonds, Jr. | 260/878 B |
| 4,127,504 | 11/1978 | Ueno et al. | 252/429 B |
| 4,245,062 | 1/1981 | Suzuki et al. | 525/323 |
| 4,301,256 | 11/1981 | Jezl | 525/247 |
| 4,330,649 | 5/1982 | Kioka et al. | 526/125 |
| 4,339,557 | 7/1982 | Hasuo et al. | 525/247 |
| 4,365,045 | 12/1982 | Schneider et al. | 525/247 |
| 4,414,369 | 11/1983 | Kuroda et al. | 526/65 |
| 4,459,385 | 7/1984 | McCulloch, Jr. | 525/88 |
| 4,492,787 | 1/1985 | Takashima et al. | 525/53 |
| 4,499,247 | 2/1985 | Chiba et al. | 526/142 |
| 4,500,682 | 2/1985 | Chiba et al. | 525/240 |
| 4,510,292 | 4/1985 | Chiba et al. | 525/247 |
| 4,526,931 | 7/1985 | Chiba et al. | 525/268 |
| 4,535,125 | 8/1985 | McCullough, Jr. | 525/88 |
| 4,543,400 | 9/1985 | Wristers | 526/119 |
| 4,547,552 | 10/1985 | Toyata et al. | 525/247 |

FOREIGN PATENT DOCUMENTS

| | | |
|---|---|---|
| 45975 | 8/1980 | European Pat. Off. . |
| 94818 | 11/1983 | European Pat. Off. . |
| 131268 | 1/1985 | European Pat. Off. . |
| 54-038389 | 3/1979 | Japan . |
| 55-123637 | 9/1980 | Japan . |
| 57-185304 | 11/1982 | Japan . |
| 57-190006 | 11/1982 | Japan . |
| 58-007406 | 1/1983 | Japan . |
| 59-149907 | 8/1984 | Japan . |
| 60-049008 | 3/1985 | Japan . |
| 60-049009 | 3/1985 | Japan . |
| 997250 | 3/1963 | United Kingdom . |
| 1038993 | 4/1963 | United Kingdom . |

*Primary Examiner*—Carman J. Seccuro
*Attorney, Agent, or Firm*—Charles E. Smith; Michael E. Wilson

[57] ABSTRACT

A modified polypropylene having a substantially isotactic homopolypropylene and a propylene/olefin random copolymer, the modified polypropylene including up to about 50 chain disruptors per 1000 propylene repeat units. The chain disruptors are racemic polypropylene diads and olefin, the olefin being incorporated into the high end of the molecular weight distribution of the modified polypropylene.

44 Claims, No Drawings

MODIFIED POLYPROPYLENE, PROCESS FOR MAKING AND ARTICLE MADE FROM THE SAME

BACKGROUND OF THE INVENTION

The present invention relates to a modified polypropylene. More particularly, the present invention relates to a modified polypropylene of a particular composition distribution and molecular weight distribution, a process for producing such modified polypropylene and an article produced from such modified polypropylene.

Polypropylene refers to that class of polymers derived primarily from propylene. The term "polypropylene" is generally understood to include both the homopolymer of propylene and "modified" polypropylene such as copolymers of propylene and blends of polypropylene with minor amounts of other components. The present invention is primarily concerned with such "modified" polypropylenes.

Polypropylene has found a wide variety of commercial uses in today's society such as, for example, candy wrappers, potato chip bags, diapers, carpet backing, battery cases and household containers to name a few.

Polypropylene is produced by polymerizing propylene and, optionally, minor amounts of other comonomers such as, for example, other alpha-olefins like ethylene, 1-butene and 1-hexane, at various temperatures and pressures in the presence of one of many well-known transition metal halide catalysts generally referred to as Ziegler or Ziegler-Natta catalysts. By proper selection of the catalyst and operating conditions, a highly stereospecific polymer can be produced.

For the case of homopolypropylene, every second carbon atom is asymmetric being bound not only to two chain methylene carbon atoms but also to one hydrogen and one methyl group. The hydrogen and methyl groups of the asymmetric carbon can lie in various arrangements in planes above and below the plane defined by the backbone carbon atoms.

"Isotactic" refers to the situation when all of such methyl groups lie in the same plane, this plane being opposite to the plane occupied by the hydrogen groups. The concentration of "meso diads" ($[m]$), which is the fraction of adjacent pairs of repeat units having the same configuration, is a quantitative measure of the degree of isotacticity of the polypropylene.

"Syndiotactic" refers to the situation where such methyl groups (and, consequently, such hydrogen groups) of consecutive asymmetric carbon atoms lie in alternating planes. The concentration of "racemic diads" ($[r]$), which is the fraction of adjacent pairs of repeat units having opposite configurations, is also used to describe the degree of stereoregularity in polypropylene.

"Atactic" refers to the situation when the hydrogen and methyl groups lie randomly in the planes above and below the asymmetric carbon. For atactic polypropylene, $[m]$ is generally about equal to $[r]$.

Highly isotactic homopolypropylene is characterized by a high value of $[m]$, a high degree of crystallinity and a low portion of material that is soluble in hydrocarbon solvents at or slightly above room temperature. Desirable properties of these highly isotactic homopolypropylenes include high tensile strength, hardness and high melting point. Undesirable properties include brittleness and low impact strength, particularly at lower temperatures. Highly isotactic homopolypropylene is also difficult to process in, for example, film applications requiring biaxial stretching of the polymer.

It is currently possible with the latest generation of propylene catalysts to produce crystalline homopolypropylenes of greater than 99% meso diads ($[m] > 0.99$). In earlier stages of catalyst development, meso diads in the low 90% range were common. Because of their high isotacticity and crystallinity, these new highly isotactic homopolypropylenes have even greater modulus, tensile strength, hardness and melting point properties than their prior art counterparts, but they suffer even more from relatively poor brittleness, low impact strength and processing problems.

It would, therefore, be highly desirable to produce a polypropylene which incorporates the best of the modulus, tensile, hardness and melting point properties characteristic of high isostatic content while concurrently improving upon the brittleness, impact and processing properties of the polymer. The present invention provides such an improved polypropylene by modifying a highly isostatic polypropylene to "plan" its composition, molecular weight distribution and crystallinity. Thus, the present invention is directed to modified polypropylenes having an unexpected brittleness, impact and processing properties associated with polypropylene copolymers while unexpectedly retaining the tensile and hardness properties associated with crystalline homopolypropylene.

Polypropylene has, in the past, been modified in a variety of ways in an attempt to alter its properties to fit a desired end use. For example, it is well known to copolymerize propylene with minor amounts of other comonomers, as well as to blend homopolypropylene with other polymers and copolymers such as, for example, propylene-ethylene copolymers, to improve impact strength and brittleness. To a certain extent, these copolymers and blends do improve the undesirable properties of highly isostatic homopolypropylene, but often at the expense of the desirable properties.

For example, prior art copolymers of propylene and other alpha-olefins generally do not combine the best properties of each homopolymer, with the presence of the other olefin negatively affecting modulus and tensile properties of homopolypropylene. Other polypropylene modifications suffer from the same shortcomings. A number of these well-known polypropylene modifications are taught by the following references, all of which incorporated by reference for all purposes as if fully set forth: U.S. Pat. Nos. 3301921, 3358056, 3401212, 3414637, 3529037, 3737557, 3817783, 3954704, 4245062, 4301256, 4339557, 4365045, 4414369, 4499247, 4492787, 4500682, 4510292 and 4526931.

SUMMARY OF THE INVENTION

The present invention overcomes many of these shortcomings of the prior art polypropylene copolymers and blends by providing a modified polypropylene which retains the desirable modulus, tensile strength, hardness and orientation properties of, yet provides improved brittleness, impact resistance and processing properties over, highly isostatic homopolypropylene.

Additionally, the present invention provides methods for producing such a modified polypropylene whereby the composition distribution, molecular weight distribution and properties related to the crystallinity of the polymer may be easily varied to suit the desired end use.

Finally, the present invention provides an article, particularly a film, made from such a modified polypropylene.

In accordance with the present invention, there is provided a modified polypropylene which, in its overall concept, comprises a reactor blend of a higher molecular weight propylene/olefin random copolymer with a lower molecular weight substantially isotactic homopolypropylene. By reactor blend, it is meant an in situ blend produced by polymerizing one or more monomers in the presence of another polymer. The resulting reactor product is a highly dispersed blend of the various polymers in which the components are mechanically inseparable.

Preferred melt flow rate (MFR) ratios, indicative of molecular weight ratios, for the copolymer to the homopolymer may vary widely, generally from about 1:100 to about 1:1. Preferred composition weight ratios of copolymer to homopolymer in the reactor blend may also vary widely, generally from about 20:1 to about 1:20. More preferred MFR and composition weight ratios are described below.

The reactor blending of the higher molecular weight random copolymer with the lower molecular weight homopolymer can provide the modified propylene with a broad range of molecular weight distributions (MWD). In preferred embodiments, MWDs range from about 3 to about 20.

Olefins suitable for use in the propylene/olefin random copolymer include one or more of ethylene and/or $C_4$ and higher alpha-olefins. The olefin is present in the modified polypropylene preferably in minor amounts generally ranging up to about 5.0 mol%, with more preferred ranges described below.

The modified polypropylene of the present invention is produced as a reactor blend in a series reactor system in which either the lower molecular weight homopolypropylene or higher molecular weight propylene/olefin random copolymer is produced in a first reactor and the other component is polymerized in the second reactor in the presence of the outlet stream from the first reactor. It is especially preferred that the random copolymer be produced in the first reactor and the homopolymer produced in the second reactor.

Modified polypropylenes and processes for making these modified propylenes in accordance with the present invention offer numerous advantages over conventional formulations and processes. Most importantly, the processes allow for the structural regularity of the polypropylene to be controlled by punctuating substantially isotactic polypropylene chains with chain disruptors in the form of either racemic polypropylene diads and/or olefins incorporated as desired into the polymer chain.

Propylene homopolymers produced by conventional processes generally contain anywhere from about 5 to 100 chain disruptors per 1000 repeat units depending upon the choice of catalyst employed during polymerization. The disrupting sequences contain racemic diads. The newer generations of "high activity" catalysts produce chain disruptors in the lower end of the aforementioned range while older, historic propylene catalysts produce chain disruptors in the upper end of this range. The chain disruptors, although essentially randomly distributed within a given chain, become more prevalent as the molecular weight of the polypropylene decreases.

It is a purpose of the present invention to control the amount, type and location of chain disruptors in a modified polypropylene. In the particular random copolymer utilized in the present invention, chain disruptors in the form of olefins are added to a highly isotactic homopolymer in such a way as to be incorporated exclusively into the high end of the molecular weight distribution. Typically, the high end of the molecular weight distribution will have a melt flow rate of up to about 2.0 dg/min. In the particular homopolypropylene utilized in the present invention, few chain disruptors are present in the lower end of the molecular weight distribution. This situation is directly opposite to the composition distribution found for racemic disruptors in polypropylenes produced by the older and newer generations of polypropylene catalysts, wherein chain disruptors are predominantly in the lower end of the molecular weight distribution.

In the present invention, it is preferred to incorporate a total of up to about 50 chain disruptors per 1000 repeat propylene chain units, the remainder of the chain units comprising the crystalline meso diad units. These chain disruptors may take the form of racemic polypropylene diads and/or olefins incorporated into the high end of the molecular weight distribution.

For the purposes of the present invention, the number of racemic disruptors per 1000 repeat units is defined by the number of racemic sequences disrupting the continuous meso sequences. Quantitatively, the total racemic diad [r] and the racemic tetrad [rrr] concentrations are required to determine the total number of times an isotactic chain is punctuated by either a pair of racemic diads or sequences involving racemic diads. The typical punctuating sequences in an isotactic homopolypropylene are:

—m m m m m m m r r m m m m m m m m—

—m m m m m m r (r)$_n$ r m m m m m m—

—m m m m m m r (m)$_n$ r m m m m m m— wherein "n" is a number which results in a sequence too short to crystallize. Upon considering the above three types of chain disruptions, the total chain disruptors involving "r" sequences per 1000 repeat units is given by:

"r" Chain Disruptors/1000 repeat
units = 500([r] − [rrr])

If an olefinic chain disruptor ("O") is utilized as an additional chain punctuating unit, the contribution from these is given by:

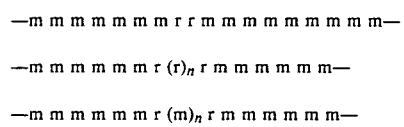

wherein [O] is the concentration of olefin. The two types of chain disruptors are added to give the total number of chain disruptors per 1000 repeat units.

The final result is a modified polypropylene with a total level of chain disruptors, including both racemic diads and olefin comonomer, comparable to many existing homopolymers and copolymers, but arranged in a novel way to create desirable physical properties and processing performance. In contrast to prior art modified polypropylenes, the modified polypropylenes of the present invention combine the desirable features of both a comparable independent homopolymer and a comparable independent copolymer. This novel arrangement is not possible in any polypropylene homopolymer or copolymer produced by any presently known catalyst system.

As is shown by the examples below, a modified polypropylene produced in this manner retains many of the desirable properties of the substantially isotactic homopolymer but is improved in impact, optical and processing properties. Additionally, the modified polypropylene retains many of the desirable properties of the copolymer but is improved in secant moduli and other properties related to crystallinity. Other properties where improvements are expected to show include heat sealability, film blocking, reduced shrinkage at elevated temperatures, surface friction, tear strength and extractability.

The modified polypropylenes of the present invention are especially suited for oriented film applications, and may also be utilized for molded and extruded products.

These and other features and advantages of the present invention will be more readily understood by those skilled in the art from a reading of the following detailed description.

DETAILED DESCRIPTION OF THE PREFERRED EMBODIMENTS

In one description of the present invention, the modified polypropylene comprises isotactic homopolypropylene chains with minor amounts of one or more types of chain disruptors incorporated in a selected portion of the molecular weight distribution. These chain disruptors may take the form of racemic diads and/or olefin comonomer incorporated into the polypropylene chain. The olefin comonomer is preferably incorporated into the high end of the molecular weight distribution.

In a preferred embodiment, the modified polypropylene comprises an average of up to about 50, more preferably up to about 30, still more preferably up to about 20, most preferably up to about 10, chain disruptors per 1000 propylene repeat units, the remainder of the polypropylene repeat units comprising the meso diad form. Of course, the ultimate number of chain disruptors will depend upon the desired end use of the modified polypropylene.

In accordance with the present invention, such a modified polypropylene comprises, in its overall concept, a reactor blend of a higher molecular weight propylene/olefin random copolymer with a lower molecular weight substantially isotactic homopolypropylene. Reactor blend, as indicated before, is a highly dispersed and mechanically inseparable blend of the various polymers produced in situ as a result of the sequential polymerization of one or more monomers with the formation of a polymer in the presence of another. By substantially isotactic, it is meant that the isotacticity of the homopolypropylene is 97% or greater ($[m] \geq 0.97$), more preferably 98% or greater ($[m] \geq 0.98$), most preferably 99% or greater ($[m] \geq 0.99$), meso diad units as measured through standard and well-known Carbon 13 NMR spectroscopy techniques.

This reactor blend preferably comprises a copolymer:homopolymer weight ratio range of from about 1:20 to about 20:1, more preferably from about 1:10 to about 10:1, still more preferably from about 1:5 to about 5:1, most preferably from about 1:4 to about 4:1. For continuous sequential reactor systems as detailed below, even more narrow composition weight ratio ranges such as, for example, 1:2 to 2:1, may be preferred. The reactor blend also comprises wide ranging copolymer:homopolymer MFR ratios, generally from about 1:100 to about 1:1, more preferably from about 1:50 to about 1:1 (ASTM D-1238, Condition L).

The olefin comonomer of the propylene/olefin random copolymer is preferably selected from one or more of ethylene and other alpha-olefins of the general formula:

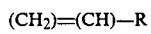

$$(CH_2)=(CH)-R$$

wherein R comprises hydrogen or a hydrocarbon group having at least 2 carbon atoms. Particularly preferred are ethylene and $C_4$ to $C_{10}$ alpha-olefins, more preferably ethylene, 1-butene or 1-hexene, and especially ethylene. The olefin is present in the final reactor blend in amounts up to about 5.0 mol%, preferably from about 0.1 mol% to about 5.0 mol%, more preferably from about 0.1 mol% to about 3.0 mol%, still more preferably from about 0.1 mol% to about 2.0 mol%, most preferably from about 0.1 to about 1.5 mol%. Mol% is based upon the combined total moles of propylene and olefin in the reactor blend.

When produced as detailed below, the reactor blend can comprise a wide ranging MWD, preferably from about 3 to about 20, more preferably from about 3 to about 10. MWD may be measured by any well-known technique such as, for example, that described by G. R. Zeichner and P. D. Patel in the Proceedings from the 2nd World Congress of Chemical Engineering, Montreal, Canada, Oct. 4–9, 1981, Vol. VI, pp. 333–37, which is incorporated by reference herein for all purposes as if fully set forth.

The modified polypropylenes in accordance with the present invention are preferably produced by polymerizing propylene in the presence of a higher molecular weight propylene/olefin random copolymer and a chain transfer agent. These modified polypropylenes may also be produced by the substantially converse process of randomly polymerizing propylene and an olefin(s) in the presence of a lower molecular weight, highly isotactic, homopolypropylene. Both of these processes are preferably carried out in a sequential reactor system, either continuously or batchwise, as described below. The resulting reactor blend is a uniform single phase product, with the homopolymer and copolymer components completely compatible in both the melt and solid states.

Referring to the first of the two above processes, propylene, olefin comonomer(s) and catalyst are fed to a first reactor and randomly copolymerized to produce the propylene/olefin chains. For the purposes of the present discussion, the first reactor will be treated as a single reactor but may also comprise a series of reactors. This should not, however, be considered a limitation on the present invention.

The polymerization catalyst may be comprised of any one of a number of well-known high activity Ziegler-type catalysts suitable for producing substantially isotactic polypropylenes. Particularly preferred catalysts include those described in U.S. Pat. Nos. 4,127,504, 4,330,649, 4,543,400 and 4,547,552, and European Patent 45975, all of which are incorporated by reference for all purposes as if fully set forth. An especially preferred catalyst system comprises a titanium trichloride catalyst component, diethyl aluminum chloride co-catalyst and methyl methacrylate modifier, such as disclosed in the aforementioned incorporated references. Another preferred catalyst system comprises a particle form, magnesium halide supported, titanium halide based catalyst with an alkyl-aluminum based co-catalyst, as also disclosed in the aforementioned incorporated references, and as commercially available under the trade designation TK-220 from Mitsui Petrochemical Company, Tokyo, Japan.

Of course, the amounts and types of catalyst component, co-catalyst and modifier utilized may vary widely depending upon reaction conditions and desired end products. Generally, the catalyst component is added to the first reactor in amounts generally ranging from about 5 ppm to about 50 ppm by weight, based upon the weight of the total monomer feed stream. From the particular type and amount of catalyst component utilized, the particular amount and type of co-catalyst and modifier may be chosen by one skilled in the art.

The propylene and comonomer(s) may be polymerized in a liquid, vapor or mixed phase reaction in, for example, a stirred or agitated reactor vessel. A liquid phase reaction in, for example, a continuous stirred reactor is preferred. Preferred polymerization temperatures generally range from about 35° C. to about 85° C., more preferably from about 45° C. to about 85° C., with polymerization pressures given by the vapor pressures of the various components. The residence time of the components in the first reactor should be sufficient to polymerize a substantial portion of the comonomer so that as little as possible is carried over to the second reactor.

As previously indicated, a higher molecular weight random copolymer is produced from the first reactor, so it is preferred to restrict hydrogen and other well-known chain transfer agents to low levels. Depending upon reaction conditions and monomer streams, it may be necessary to introduce small amounts of such chain transfer agent into the reactor to make this resulting copolymer processible in subsequent mixing stages and to optimize properties. The need for and amount of chain transfer addition will be easily determinable by one skilled in the art depending upon the desired end copolymer MFR and ultimate reactor blend MFR. It is preferred that the MFR of such copolymer be between about 0.01 to about 10.0, more preferably between about 0.1 to about 3.0, dg/min.

The molar ratio of propylene to olefin added to the first reactor will vary depending upon a number of factors such as, for example, the nature of the reactor, reaction conditions, catalyst recipe and desired olefin content of the copolymer and final reactor blend. These and other polymerization process factors are all well-known to those skilled in the art, and one so skilled can readily determine the actual molar ratio of propylene to olefin depending upon these factors.

The resulting outlet stream from the first reactor, which will generally comprise the propylene/olefin random copolymer, some living catalyst, and unreacted propylene and olefin, is then directly fed into a second reactor. If a chain transfer agent has been utilized in the first reactor, residual chain train agent may also be present in the outlet stream. Although unreacted olefin comonomer may be present in this outlet stream it is preferred to keep this to a minimum.

Along with the outlet stream from the first reactor, additional propylene and chain transfer agent are fed into the second reactor to produce a lower molecular weight substantially isotactic homopolypropylene in the presence of the copolymer. The resulting product is an intimately mixed blend of a propylene/olefin random copolymer and a substantially isotactic homopolypropylene. The catalyst from the first reactor continues to act as the catalyst for the propylene polymerization. If desired, another or additional high activity catalyst may also be fed to the second reactor to act in conjunction with the catalyst from the first reactor.

As with the first reactor, the second reactor may also comprise a single reactor or series of reactors, and this again should not be considered a limitation on the present invention.

The reaction conditions in the second reactor are essentially the same as in the first reactor, i.e., preferably a liquid phase reaction in a continuous stirred reactor at temperatures ranging from about 35° C. to about 85° C. and pressures given by the vapor pressures of the various components. Because a lower molecular weight polymer is desired, it is preferred to add a chain transfer agent to the second reactor to control the molecular weight of the homopolypropylene. For the particular case of hydrogen, it is preferred to add between 350 ppm to about 1500 ppm by weight. The product resulting from this second reactor includes the reactor blend as described above.

This reactor blend may be recovered by processing the outlet stream from the second reactor in any manner familiar in the art, such as by filtering the residue to remove the liquid portion then steam stripping the remainder to remove other impurities. These finishing procedures are well-known in the art and need not be further detailed herein.

Referring now to the second of the two processes, it is essentially the converse of the first process. In other words, the lower molecular weight substantially isotactic homopolypropylene is produced in the first reactor and the propylene/olefin random copolymer is produced in the second reactor in the presence of the homopolypropylene.

Propylene, catalyst and a chain transfer agent are fed into the first reactor in amounts and under conditions as described above. The residence time of the components in the first reactor should be sufficient to react substantially all of the chain transfer agent so that as little as possible is carried over to the second reactor.

As previously indicated, a chain transfer agent may be utilized to produce the lower molecular weight substantially isotactic homopolypropylene within the first reactor. It is preferred that the MFR of such homopolypropylene be between about 1.0 to about 50.0 dg/min, more preferably between about 5.0 to about 25.0 dg/min.

The resulting outlet stream from the first reactor, which will generally comprise the homopolypropylene, unreacted propylene, residual chain transfer agent and some living catalyst, is then fed into the second reactor. Along with the outlet stream from the first reactor, additional propylene and olefin comonomer are also fed into the second reactor to produce a propylene/olefin random copolymer in the presence of the homopolypropylene. The resulting product is an intimately mixed blend of highly isotactic homopolypropylene and propylene/olefin copolymer.

As before, it is preferred to restrict the chain transfer agent from the propylene/olefin random copolymerization in the second reactor to produce a higher molecular weight copolymer. Also, the catalyst utilized in the first reactor again acts as the catalyst for the propylene-olefin copolymerization. As described above, if desired another or additional catalyst may also be fed to the second reactor to act in conjunction with the first catalyst.

The resulting reactor blend may be recovered by processing the outlet stream from the second reactor in any manner familiar in the art by any one of the number of well-known finishing processes.

By either of the aforementioned processes, the reactor blend (modified polypropylene) from the second reactor may be modified to comprise varying comonomer contents and varying average molecular weights and molecular weight distributions by adjusting the feeds to the first and second reactors.

The modified polypropylene so produced by the aforedescribed methods will have wide ranging physical properties suitable for a variety of applications. For example, those having an MWD of from about 5 to about 10 can be extruded or coextruded by any one of a number of well-known processes for use in film applications. The higher molecular weight copolymer in the presence of the lower molecular weight homopolymer leads to improved oriented polypropylene film stretchability, gauge uniformity and optics relative to prior art polypropylenes and modified polypropylenes. The lower molecular weight homopolymer contributes to increased film stiffness, and reduces permeability and solvent extractability. Small amounts of comonomer in the higher molecular weight random copolymer leads to improved film stretchability.

Preparation of biaxially oriented film from the above-described polypropylenes is readily done by methods well-known in the art. For example, the polymer can be extruded through a slot die, then oriented in a sheet sequentially along the machine and transverse directions (MD and TD, respectively) at elevated temperatures below the polymer melting point. Alternatively, the polymer can be extruded into tubular form and then oriented simultaneously along the MD and TD by blowing at elevated temperatures slightly below the polymer melting point.

The foregoing more general discussion of this invention will be further exemplified by the following specific examples offered by way of illustration and not limitation of the above-described invention.

EXAMPLES

In the following examples, resin and film properties were measured by the following tests:
(1) Melt Flow Rate—ASTM D-1238, Condition L.
(2) Ethylene Mol%—FTIR.
(3) Impact Strength—impact strength is measured in conjunction with a Kaynes Total Impact Energy Tester by the use of a free falling dart of sufficient weight to pass through the test sample as described in the apparatus instruction manual.
(4) MWD—as described in the previously incorporated article by G. R. Zeichner and P. D. Patel.
(5) Haze—ASTM D-1003-61.
(6) Secant Modulus—ASTM D-882.
(7) Tensile Strength and Elongation—ASTM D-882.
(8) Operating Window (defined with respect to a particular property)—the temperature range in which a film property is still within the prescribed limits as the TD stretching temperature is varied.
(9) Number of Chain Disruptors—conventional Carbon 13 NMR techniques.

The various materials utilized in the following examples are described below, with various other properties of the compounds presented in Table I:

(A) HPP—a commercial crystalline homopolypropylene, available under the trade designation PP-4092, from Exxon Chemical Company, Houston, Tex.

(B) CPE—a reference polypropylene/ethylene random copolymer with 0.6 mol% ethylene. This copolymer was produced in series reactors with varying ethylene and hydrogen concentrations to produce a final product that is uniform in ethylene content with essentially the same molecular weight.

In a first reactor, propylene, ethylene (0.09 mol% in the vapor phase), hydrogen (0.64 mol% in the vapor phase), 40 ppm by weight (based upon the propylene feed) of the titanium catalyst component (described below for Resin A), 420 ppm by weight (based upon the propylene feed) of diethyl aluminum chloride and 21 ppm by weight (based upon the propylene feed) of methyl methacrylate modifier into a first continuous stirred reactor.

The first continuous stirred reactor was operated at about 165° F. and a vapor pressure given by the vapor pressure of the resulting liquid at this temperature. The average residence time in the reactor was about 2.5 hours.

The slurry from the first continuous stirred reactor, including the copolymer with live catalyst particles, was then fed to a second continuous stirred reactor operating at about 155° F., to which was fed additional propylene, ethylene (0.10 mol% in the vapor phase) and hydrogen (0.96 mol% in the vapor phase). The residence time in this second reactor was about 1.5 hours.

The resulting copolymer comprised about 66% by weight of the copolymer from the first reactor and about 34% by weight of the copolymer from the second reactor. Other properties of the resulting reactor blend are presented in Table I below.

(C) Resin A—this resin was produced by feeding propylene, ethylene (0.13 mol% in the vapor phase), hydrogen (0.49 mol% in the vapor phase), 40 ppm by weight (based upon the propylene feed) of a titanium catalyst component, 420 ppm by weight (based upon the propylene feed) of diethyl aluminum chloride and 27 ppm by weight (based upon the propylene feed) of methyl methacrylate modifier into a first continuous stirred reactor.

On a laboratory scale, the titanium trichloride catalyst component may be prepared by adding 180 ml of 4M diethyl aluminum chloride (DEAC) over 6 hours to 71.1 ml of neat $TiCl_4$ in 278.1 ml of hexane in a one liter reactor at a temperature controlled between about $-2°$ C. to about $+2°$ C. Upon completion of the DEAC addition, the reaction was maintained for one hour, then heated at a rate of 120° C. to 20° C. then 2° C. to 65° C. and maintained at 65° C. for another hour. To the resultant brownish $TiCl_3$ solids with mother liquor was added 60 ml of hexane. This slurry was contacted in a nitrogen purged one liter reactor equipped with an agitator with 55.8 g of propylene by passing propylene into the reactor at a rate of about 1 g/min. and at a temperature of about 38° C. to obtain a prepolymerized $TiCl_3$ comprising about 30 wt% polymer. The recovered hexane washed (4× by decantation in 681 ml hexane at 60° C. and settling ½ hour prior to decantation) prepolymerized $TiCl_3$ wet cake was contacted in 116 ml hexane containing 109 g of hexachloroethane and 90 g di-n-butyl ether. The reactor was heated to 85° C. and held at this temperature for 5 hours with agitation. The recovered TiCl₃ catalyst was washed 4× in hexane by decantation and dried to yield the finished catalyst component. For ease of feeding to the polymerization reactor, the catalyst component was used as a 30 wt% slurry in a mineral oil.

The catalyst component actually used for these examples was prepared in a scaled-up version of this laboratory procedure.

The first continuous stirred reactor was operated at about 167° F. and a vapor pressure given by the vapor pressure of the resulting liquid at this temperature. The average residence time in the reactor was about 3.5 hours. The resulting random propylene/ethylene copolymer comprised an ethylene content of about 1.1 mol% and an MFR of about 1.2 dg/min.

The slurry from the first continuous stirred reactor, including the copolymer with live catalyst particles, was then fed to a second continuous stirred reactor operating at about 150° F., to which was fed additional propylene and hydrogen (5.0 mol% in the vapor phase). A homopolymer having an MFR of about 27.5 dg/min continued to grow on the same catalyst particles bearing the copolymer to produce the in situ (reactor) blended Resin A. The residence time in this second reactor was about 2.5 hours.

The slurry from this second continuous stirred reactor was washed by continuous countercurrent contacting with a mixture of propylene and iso-butyl alcohol, then dried by heating at 100° C. in an agitated, nitrogen gas swept dryer. The resulting reactor blend comprised about 71.0% by weight of the random copolymer and about 29.0% by weight of the homopolypropylene. Other properties of the resulting reactor blend are presented in Table I below.

(D) Resin B—this resin was produced by feeding propylene, hydrogen (2.0 mol% in the vapor phase), 40 ppm by weight (based upon the propylene feed) of the titanium catalyst component, 420 ppm by weight (based upon the propylene feed) of diethyl aluminum chloride and 27 ppm by weight (based upon the propylene feed) of methyl methacrylate modifier into a first continuous stirred reactor.

The first continuous stirred reactor was operated at about 165° F. and a vapor pressure given by the vapor pressure of the resulting liquid at this temperature. The average residence time in the reactor was about 2.3 hours. The resulting homopolypropylene comprised an an MFR of about 8.6 dg/min.

The slurry from the first continuous stirred reactor, including the homopolymer with live catalyst particles, was then fed to a second continuous stirred reactor operating at about 155° F., to which was fed ethylene (0.48 mol% in the vapor phase) and additional propylene and hydrogen (0.85 mol% in the vapor phase). A random propylene/ethylene copolymer having an ethylene content of about 3.1 mol% and an MFR of about 1.7 dg/min continued to grow on the same catalyst particles bearing the homopolymer to produce the in situ (reactor) blended Resin B. The residence time in this second reactor was about 2.7 hours.

The slurry from this second continuous stirred reactor was processed as with Resin A. The resulting reactor blend comprised about 44.2% by weight of the random copolymer and about 55.8% by weight of the homopolypropylene. Other properties of the resulting reactor blend are presented in Table I below.

(E) Resin C—this resin was produced by feeding propylene, ethylene (0.39 mol% in the vapor phase), hydrogen (0.62 mol% in the vapor phase), 40 ppm by weight (based upon the propylene feed) of the titanium catalyst component, 420 ppm by weight (based upon the propylene feed) of diethyl aluminum chloride and 27 ppm by weight (based upon the propylene feed) of methyl methacrylate modifier into a first continuous stirred reactor.

The first continuous stirred reactor was operated at about 165° F. and a vapor pressure given by the vapor pressure of the resulting liquid at this temperature. The average residence time in the reactor was about 3.3 hours. The resulting random propylene/ethylene copolymer comprised an ethylene content of about 2.7 mol% and an MFR of about 1.4 dg/min.

The slurry from the first continuous stirred reactor, including the copolymer with live catalyst particles, was then fed to a second continuous stirred reactor operating at about 150° F., to which was fed additional propylene and hydrogen (4.8 mol% in the vapor phase). A homopolymer having an MFR of about 22.0 dg/min continued to grow on the same catalyst particles bearing the copolymer to produce the in situ (reactor) blended Resin C. The residence time in this second reactor was about 2.5 hours.

The slurry from this second continuous stirred reactor was treated as with Resin A. The resulting reactor blend comprised about 78.0% by weight of the random copolymer and about 22% by weight of the homopolypropylene. Other properties of the resulting reactor blend are presented in Table I below.

(F) Resin D—this resin was produced by feeding propylene, ethylene (0.59 mol% in the vapor phase), hydrogen (0.11 mol% in the vapor phase), 10 ppm by weight (based upon the propylene feed) of the titanium catalyst component, 55 ppm by weight (based upon the propylene feed) of triethyl aluminum alkyl (TEAL) and 17 ppm by weight (based upon the propylene feed) of methyl methacrylate modifier into a first continuous stirred reactor.

The first continuous stirred reactor was operated at about 165° F. and a vapor pressure given by the vapor pressure of the resulting liquid at this temperature. The average residence time in the reactor was about 2.8 hours. The resulting random propylene/ethylene copolymer comprised an ethylene content of about 2.5 mol% and an MFR of about 0.75 dg/min.

The slurry from the first continuous stirred reactor, including the copolymer with live catalyst particles, was then fed to a second continuous stirred reactor operating at about 150° F., to which was fed additional propylene and hydrogen (1.2 mol% in the vapor phase). A homopolymer having an MFR of about 11.7 dg/min continued to grow on the same catalyst particles bearing the copolymer to produce the in situ (reactor) blended Resin C. The residence time in this second reactor was about 2.5 hours.

The slurry from this second continuous stirred reactor was treated as with Resin A. The resulting reactor blend comprised about 57.0% by weight of the random copolymer and about 43.0% by weight of the homopolypropylene. Other properties of the resulting reactor blend are presented in Table I below.

G) Resin E—this resin was produced by feeding propylene, ethylene (0.12 mol% in the vapor phase), hydrogen (0.52 mol% in the vapor phase), 40 ppm by weight (based upon the propylene feed) of the titanium catalyst component, 420 ppm by weight (based upon the propylene feed) of diethyl aluminum chloride and 27 ppm by weight (based upon the propylene feed) of methyl methacrylate modifier into a first continuous stirred reactor.

The first continuous stirred reactor was operated at about 165° F. and a vapor pressure given by the vapor pressure of the resulting liquid at this temperature. The average residence time in the reactor was about 3.4 hours. The resulting random propylene/ethylene copolymer comprised an ethylene content of about 1.1 mol% and an MFR of about 1.3 dg/min.

The slurry from the first continuous stirred reactor, including the copolymer with live catalyst particles, was then fed to a second continuous stirred reactor operating at about 150° F., to which was fed additional propylene and hydrogen (4.6 mol% in the vapor phase). A homopolymer having an MFR of about 18.0 dg/min continued to grow on the same catalyst particles bearing the copolymer to produce the in situ (reactor) blended Resin C. The residence time in this second reactor was about 2.6 hours.

The slurry from this second continuous stirred reactor was treated as with Resin A. The resulting reactor blend comprised about 74.0% by weight of the random copolymer and about 26.0% by weight of the homopolypropylene. Other properties of the resulting reactor blend are presented in Table I below.

EXAMPLES 1-5 AND COMPARATIVE EXAMPLES 1 AND 2

Each resin, as set forth in Table I, was extruded through a slot die and the subsequent sheet was oriented sequentially along MD by 4.7× and along TD by 8.7× while heated at selected temperatures over a range from 110° C. to 168° C. The film was tested for selected properties, with the results presented in Table II.

TABLE I

| Ex. | Resin | Ethylene (mol % by FTIR) | MFR (dg/m) | MWD | Chain Disrupt./ 1000 Units (by C-13 NMR) | |
|---|---|---|---|---|---|---|
| | | | | | Racemic | Ethylene |
| 1 | A | 0.6 | 3.2 | 5.8 | 9 | 7 |
| 2 | B | 1.4 | 2.9 | 6.2 | 7 | 9 |
| 3 | C | 1.5 | 3.0 | 5.5 | 5 | 18 |
| 4 | D | 1.7 | 2.1 | 4.5 | 8 | 12 |
| 5 | E | 0.6 | 2.3 | 5.5 | 8 | 7 |
| C1 | CPE | 0.6 | 2.5 | 4.9 | 9 | 5 |
| C2 | HPP | 0.0 | 2.5 | 5.1 | 10 | 0 |

TABLE II

| Ex. | Haze (%) | Gauge Op. W. (°C.) | Haze Op. W. (°C.) | Sec. Mod. MD/TD (kpsi) | Impact (23° C.) (ft-lbs) | Tens. Str. MD/TD (kpsi) | Elong. MD/TD (%) |
|---|---|---|---|---|---|---|---|
| 1 | 0.8 | 13 | 18 | 314/530 | 2.6 | 21/42 | 159/46 |
| 2 | 0.6 | 17 | 23 | 295/502 | 3.8 | 21/41 | 162/33 |
| 3 | 0.5 | 17 | 47 | 277/480 | 2.9 | 21/41 | 142/57 |
| 4 | 0.4 | 23 | 30+ | 292/517 | 3.0 | 24/44 | 158/46 |
| 5 | 0.8 | 12 | — | 311/500 | 3.4 | 23/40 | 147/48 |
| C1 | 0.6 | 11 | 18 | 272/448 | 3.7 | 23/38 | 155/51 |
| C2 | 0.5 | 18 | 30+ | 290/556 | 2.1 | 22/47 | 150/55 |

As the examples show, the resins produced with planned composition distributions and MWDs in accordance with the present invention provide improvements in oriented polypropylene film processability and properties. At similar ethylene contents, these resins have comparable or wider processing windows and higher stiffness than the reference random copolymer resin. Further, resins A and B have secant moduli in the MD/TD directions comparable to that of a commercial homopolypropylene, while the reference random copolymer does not. Even resin D, which has 1.4 mol% ethylene, is superior in MD/TD secant moduli to the reference random copolymer which has a much lower ethylene content (0.6 mol%) uniformly distributed. The process operating windows for resins A-E are uniformly superior to those of the reference random copolymer, and can be designed to be either comparable or superior to the commercial homopolypropylene. Additionally, the impact strengths of resins A-E are much closer to the reference random copolymer, with great improvement over the homopolymer. These results clearly indicate the advantages of the modified polypropylenes and processes of producing such modified polypropylenes in accordance with the present invention.

Many modification and variations besides the embodiments specifically mentioned may be made in the compositions and methods described herein and depicted in the accompanying drawing without substantially departing from the concept of the present invention. Accordingly, it should be clearly understood that the form of the invention described and illustrated herein is exemplary only, and is not intended as a limitation on the scope thereof.

We claim:

1. A modified polypropylene comprising a reactor blend of higher molecular weight propylene/olefin random copolymer and a lower molecular weight substantially isotactic homopolypropylene, wherein said homopolypropylene comprises an isotactic content of at least about 97% meso diad units, said modified polypropylene further comprising:

a copolymer:homopolypropylene weight ratio of from about 1:20 to about 20:1;

a copolymer:homopolypropylene melt flow ratio of from about 1:1 to about 1:100;

an olefin content up to about 5.0 mol%, said olefin being selected from one or more of ethylene and alpha-olefins of the formula $(CH_2)=(CH)-R$, wherein R is a hydrocarbon group having at least two carbon atoms; and an average of up to about 50 chain disruptors per 1000 propylene repeat units, said chain disruptors comprising racemic polypropylene diads and said olefin incorporated into a polypropylene chain wherein said olefin is incorporated into the upper end of the molecular weight distribution of said modified polypropylene.

2. The modified polypropylene of claim 1, wherein said modified polypropylene further comprises an olefin content of from about 0.1 mol% to about 5.0 mol%.

3. The modified polypropylene of claim 2, wherein said modified polypropylene further comprises an olefin content of from about 0.1 mol% to about 3.0 mol%.

4. The modified polypropylene of claim 3, wherein said modified polypropylene further comprises an olefin content of from about 0.1 mol% to about 1.5 mol%.

5. The modified polypropylene of claim 1, wherein said olefin is selected from one or more of ethylene and $C_4$ to $C_{10}$ alpha-olefins.

6. The modified polypropylene of claim 5, wherein said olefin is selected from one or more of ethylene, 1-butene and 1-hexene.

7. The modified polypropylene of claim 6, wherein said olefin comprises ethylene.

8. The modified polypropylene of claim 1, wherein said reactor blend further comprises a copolymer:homopolypropylene weight ratio of from about 1:10 to about 10:1.

9. The modified polypropylene of claim 8, wherein said modified polypropylene further comprises a copolymer:homopolypropylene weight ratio of from about 1:5 to about 5:1.

10. The modified polypropylene of claim 9, wherein said modified polypropylene further comprises a copolymer:homopolypropylene weight ratio of from about 1:4 to about 4:1.

11. The modified polypropylene of claim 1, wherein said homopolypropylene comprises an isotactic content of at least about 98% meso diad units.

12. The modified polypropylene of claim 11, wherein said homopolypropylene comprises an isotactic content of at least about 99% meso diad units.

13. The modified polypropylene of claim 1, wherein said modified polypropylene further comprises up to about 30 chain disruptors per 1000 propylene repeat units.

14. The modified polypropylene of claim 13, wherein said modified polypropylene further comprises up to about 20 chain disruptors per 1000 propylene repeat units.

15. The modified polypropylene of claim 14, wherein said modified polypropylene further comprises up to about 10 chain disruptors per 1000 propylene repeat units.

16. The modified polypropylene of claim 1, wherein said modified polypropylene further comprises an MWD of between about 3 to about 20.

17. The modified polypropylene of claim 1, wherein said modified polypropylene comprises a reactor blend of said substantially isotactic homopolypropylene and said propylene/olefin random copolymer.

18. A process for producing a modified polypropylene, comprising the steps of:
randomly copolymerizing propylene and an olefin in a first reactor in the presence of a high activity catalyst, thereby generating an outlet stream comprising a propylene/olefin random copolymer and a living high activity catalyst; and
feeding said outlet stream, additional propylene and a chain transfer agent into a second reactor to produce a reactor blend of a substantially isotactic homopolypropylene and said random propylene/olefin copolymer, wherein said homopolypropylene comprises an isotactic content of at least about 97% mesodiad units, said reactor blend comprising:
a copolymer:homopolypropylene melt flow ratio of from about 1:1 to about 1:100,
an olefin content up to about 5.0 mol%, said olefin being selected from one or more of ethylene and alpha-olefins of the formula $(CH_2)=(CH)-R$, wherein R is a hydrocarbon group having at least two carbon atoms, and
an average of up to about 50 chain disruptors per 1000 propylene repeat units, said chain disruptors comprising racemic polypropylene diads and said olefin incorporated into a polypropylene chain wherein said olefin is incorporated into the upper end of the molecular weight distribution of said reactor blend.

19. The process of claim 18, wherein said reactor blend further comprises an olefin content of from about 0.1 mol% to about 5.0 mol%.

20. The process of claim 19, wherein said reactor blend further comprises an olefin content of from about 0.1 mol% to about 3.0 mol%.

21. The process of claim 18, wherein said olefin is selected from one or more of ethylene and $C_4$ to $C_{10}$ alpha-olefins.

22. The process of claim 21, wherein said olefin is selected from one or more of ethylene, 1-butene and 1-hexene.

23. The process of claim 22, wherein said olefin comprises ethylene.

24. The process of claim 18, wherein said reactor blend further comprises a copolymer:homopolypropylene weight ratio of from about 1:20 to about 20:1.

25. The process of claim 24, wherein said reactor blend further comprises a copolymer:homopolypropylene weight ratio of from about 1:10 to about 10:1.

26. The process of claim 18, wherein said reactor blend further comprises up to about 30 chain disruptors per 1000 propylene repeat units.

27. A process for producing a modified polypropylene, comprising the steps of:
polymerizing propylene in a first reactor in the presence of a high activity catalyst and a chain transfer agent, thereby generating an outlet stream comprising a substantially isotactic homopolypropylene and a living said high activity catalyst; and
feeding said outlet stream, additional propylene and an olefin into a second reactor to produce a reactor blend of a propylene/olefin random copolymer with said substantially isotactic polypropylene, wherein said homopolypropylene comprises an isotactic content of at least about 97% mesodiad units, said reactor blend further comprising:
a copolymer:homopolypropylene melt flow ratio of from about 1:1 to about 1:100,
an olefin content up to about 5.0 mol%, said olefin being selected from one or more of ethylene and alpha-olefins of the formula $(CH_2)=(CH)-R$, wherein R is a hydrocarbon group having at least two carbon atoms, and
an average of up to about 50 chain disruptors per 1000 propylene repeat units, said chain disruptors comprising racemic polypropylene diads and said olefin incorporated into a polypropylene chain wherein said olefin is incorporated into the upper end of the molecular weight distribution of said reactor blend.

28. The process of claim 27, wherein said reactor blend further comprises an olefin content of from about 0.1 mol% to about 5.0 mol%.

29. The process of claim 28, wherein said reactor blend further comprises an olefin content of from about 0.1 mol% to about 3.0 mol%.

30. The process of claim 27, wherein said olefin is selected from one or more of ethylene and $C_4$ to $C_{10}$ alpha-olefins.

31. The process of claim 30, wherein said olefin is selected from one or more of ethylene, 1-butene and 1-hexene.

32. The process of claim 31, wherein said olefin comprises ethylene.

33. The process of claim 27, wherein said reactor blend further comprises a copolymer:homopolypropylene weight ratio of from about 1:20 to about 20:1.

34. The process of claim 33, wherein said reactor blend further comprises a copolymer:homopolypropylene weight ratio of from about 1:10 to about 10:1.

35. The process of claim 27, wherein said reactor blend further comprises up to about 30 chain disruptors per 1000 propylene repeat units.

36. A film produced from a modified polypropylene, wherein said modified polypropylene comprises a reactor blend of a propylene/olefin random copolymer with a substantially isotactic homopolypropylene, wherein said homopolypropylene comprises an isotactic content of at least about 97% mesodiad units, said reactor blend further comprising:

a copolymer:homopolypropylene melt flow ratio of from about 1:1 to about 1:100;

an olefin content up to about 5.0 mol%, said olefin being selected from one or more of ethylene and alpha-olefins of the formula $(CH_2)=(CH)-R$, wherein R is a hydrocarbon group having at least two carbon atoms; and an average of up to about 50 chain disruptors per 1000 propylene repeat units, said chain disruptors comprising racemic polypropylene diads and said olefin incorporated into a polypropylene chain wherein said olefin is incorporated into the upper end of the molecular weight distribution of said reactor blend.

37. The film of claim 36, wherein said reactor blend further comprises an olefin content of from about 0.1 mol% to about 5.0 mol%.

38. The film of claim 37, wherein said reactor blend further comprises an olefin content of from about 0.1 mol% to about 3.0 mol%.

39. The film of claim 36, wherein said olefin is selected from one or more of ethylene and $C_4$ to $C_{10}$ alpha-olefins.

40. The film of claim 39, wherein said olefin is selected from one or more of ethylene, 1-butene and 1-hexene.

41. The film of claim 40, wherein said olefin comprises ethylene.

42. The film of claim 36, wherein said reactor blend further comprises a copolymer:homopolypropylene weight ratio of from about 1:20 to about 20:1.

43. The film of claim 42, wherein said reactor blend further comprises a copolymer:homopolypropylene weight ratio of from about 1:10 to about 10:1.

44. The film of claim 36, wherein said reactor blend further comprises up to about 30 chain disruptors per 1000 propylene repeat units.

* * * * *